United States Patent
Degani et al.

(10) Patent No.: US 6,894,805 B2
(45) Date of Patent: May 17, 2005

(54) METHOD AND SYSTEM FOR APPLYING BLACK OVERPRINT, ANTI-ALIASING, AND TRAPPING ON A PAGE BASIS

(75) Inventors: Ammar T. Degani, Rochester, NY (US); Susan Evans, California City, CA (US); W. Dale Knutsen, San Francisco, CA (US); Jindong Chen, Belmont, CA (US)

(73) Assignee: Xerox Corporation, Stamford, CT (US)

( * ) Notice: Subject to any disclaimer, the term of this patent is extended or adjusted under 35 U.S.C. 154(b) by 895 days.

(21) Appl. No.: 09/750,606

(22) Filed: Dec. 28, 2000

(65) Prior Publication Data
US 2002/0085218 A1 Jul. 4, 2002

(51) Int. Cl.[7] .................................................. H04N 1/40
(52) U.S. Cl. ....................................... 358/1.4; 358/500
(58) Field of Search ........................ 358/1.9, 1.4, 2.1, 358/1.15–1.17, 448, 453, 515–518, 500

(56) References Cited

U.S. PATENT DOCUMENTS

| | | | |
|---|---|---|---|
| 5,138,465 A | * | 8/1992 | Ng et al. .................... 358/453 |
| 5,274,468 A | * | 12/1993 | Ojha .......................... 358/448 |
| 5,371,844 A | | 12/1994 | Andrew et al. |
| 5,579,446 A | | 11/1996 | Naik et al. |
| 5,704,021 A | | 12/1997 | Smith et al. |
| 5,872,895 A | | 2/1999 | Zandee et al. |
| 6,006,013 A | | 12/1999 | Rumph et al. |

* cited by examiner

Primary Examiner—Thomas D. Lee
Assistant Examiner—Stephen Brinich
(74) Attorney, Agent, or Firm—Fay, Sharpe, Fagan, Minnich & McKee LLP

(57) ABSTRACT

A method and system to print selective pages of color images within a print job having a plurality of pages using selected color improvement options such as black overprint, anti-aliasing, and trapping. The system identifies and selects one or more pages within a single print job having a set of a plurality of pages and is able to apply a plurality of different color improvement operations upon printing pages having color images thereon. A user interface enables the assigning of a first color improvement operation to a first subset of pages within the single print job. A processor determines if the page being processed is a member of the first subset of pages that have the first color improvement assigned thereto and performs the first color improvement operation upon the image data associated with the page when it determines that the page being processed is a member of the first subset of pages that have the first color improvement assigned thereto.

12 Claims, 3 Drawing Sheets

METHOD AND SYSTEM FOR APPLYING BLACK OVERPRINT, ANTI-ALIASING, AND TRAPPING ON A PAGE BASIS

FIELD OF THE PRESENT INVENTION

The present invention relates generally to color printing. More particularly, the present invention relates to the printing of different pages of a print job with different color improvement operations such as black overprint, anti-aliasing, and trapping.

BACKGROUND OF THE PRESENT INVENTION

The use of color monitors for computers has accelerated the need for color printers that can produce a satisfactory printout corresponding as closely as possible to what is displayed on the screen. With such equipment, determining what constitutes a "satisfactory" color printout is often quite problematic.

Part of this problem arises from the subjective nature of color. Color is a sensation produced by the combined effects of light, objects, and human vision. A particular color or combination of colors may be appealing to one person while at the same time being offensive to another.

Another part of the "satisfactory"-color definitional problem arises from the different color technologies used in computer monitors and color printers. For example, computer monitors are based on a color gamut of red, green and blue pixels (RGB), whereas color printers such as xerographic printers or inkjet printers are typically based on a color gamut of cyan, magenta, yellow and black (CMYK). The RGB color components of computer monitors are combined together in an "additive" way by mixing red, green and blue light rays to form a first variety of different colors; but the CMYK components of color toners or inks are applied to media in different combinations in a "subtractive" way to form a second variety of different colors.

Various different color-management techniques have been used to provide some form of matching between, for instance, the colors viewed on a computer monitor and the colors printed by a specific printer using a given toner set or ink formula on a particular type of printing medium. Such color-management techniques have also employed different types of halftoning algorithms (in this art commonly called "rendition" or sometimes "rendering") to improve appearance of color printout of various type of objects (or in traditional publications jargon "copy"). Moreover to improve the appearance of the printed image, other techniques or operations have been applied. These color improvement techniques include black overprint, anti-aliasing, and trapping. Black overprint is a color improvement technique that involves printing a black foreground object directly over a non-black background object by adding black colorant over the background object. This technique offers improved tolerance to color plane misregistration compared to the typical technique of knockout. Anti-aliasing is a color improvement operation that involves the use of intermediate levels of intensity to achieve more accurate line work rendition and reduction in the jagged effects. Trapping is a color improvement operation that involves removing defects caused by misregistration between color separations that manifest as gaps and hue shifts in overlaps near the edges of abutting objects of different colors.

Desktop publishing software has created an additional dimension of the satisfactory-color-definition problem by printing together, in a composite document, objects (or "copy") of different types. Such types include photos and photograph-like images, business graphics (e.g., charts and logos), and scalable text in both color and black.

With the advent of having such diverse objects within a print job, the necessity to have black overprint, anti-aliasing, and trapping available to the digital front end ("DFE") of the color printing system becomes more essential. Conventionally, these color improvement operations have been applied automatically or by user direction on a whole job basis to improve the quality of the image being produced. However, these color improvement operations have a negative impact with respect to the processing time as well as the processing resources required to decompose each page of the job to perform the desired operations. Since these color improvement operations have a negative processing impact, these color improvement operations are usually only "turned on" on a job basis. This programming on a job basis is still too ineffective when only a few pages of a very large job requires such color improvement operations to actually improve the quality of the printed image. To utilize this extra processing time and resources for pages, whose quality will not be noticeably improved, can have a significant negative impact upon the productivity of the DFE and the overall color printing system.

There is thus a need for a printer-management system that enables a user or operator to take advantage of the color improvement operations discussed above. Such a system must also provide flexibility so that these processing intensive color improvement operations can be applied on a discriminate basis so as to avoid any unneeded negative impact upon productivity. Such a system will apply these color improvement operations where needed and minimize a negative impact upon processing resources.

SUMMARY OF THE PRESENT INVENTION

One aspect of the present invention is a method of color printing for use in printing selective pages of color images within a print job having a plurality of pages. The method provides means for identification and selection of one or more pages within a single print job having a set of a plurality of pages; provides means for applying a plurality of different color improvement operations upon printing pages having color images thereon; assigns a first color improvement operation to a first subset of pages within the single print job; processes a page within a print job; determines if the page being processed is a member of the first subset of pages that have the first color improvement assigned thereto; and performs the first color improvement operation upon the image data associated with the page when it is determined that the page being processed is a member of the first subset of pages that have the first color improvement assigned thereto.

Another aspect of the present invention is a system of color printing for use in printing selective pages of color images within a print job having a plurality of pages. The system includes a user interface to identify and select one or more pages within a single print job having a set of a plurality of pages and a processor to apply a plurality of different color improvement operations upon printing pages having color images thereon. The user interface assigns a first color improvement operation to a first subset of pages within the single print job. The processor processes a page within a print job; determines if the page being processed is a member of the first subset of pages that have the first color improvement assigned thereto; and performs the first color improvement operation upon the image data associated with the page when the processor determines if the page being processed is a member of the first subset of pages that have the first color improvement assigned thereto.

All of the foregoing operational principles and advantages, and others, of the present invention will be more fully appreciated upon consideration of the following detailed description, with reference to the appended drawings, of which:

BRIEF DESCRIPTION OF THE DRAWINGS

The present invention may take form in various components and arrangements of components, and in various steps and arrangements of steps. The drawings are only for purposes of illustrating a preferred embodiment and are not to be construed as limiting the present invention.

DETAILED DESCRIPTION OF THE PRESENT INVENTION

Generally speaking, the present invention provides improved print quality for composite documents which have different types of objects to be printed in the same document and in many instances on the same page.

Figure 1:
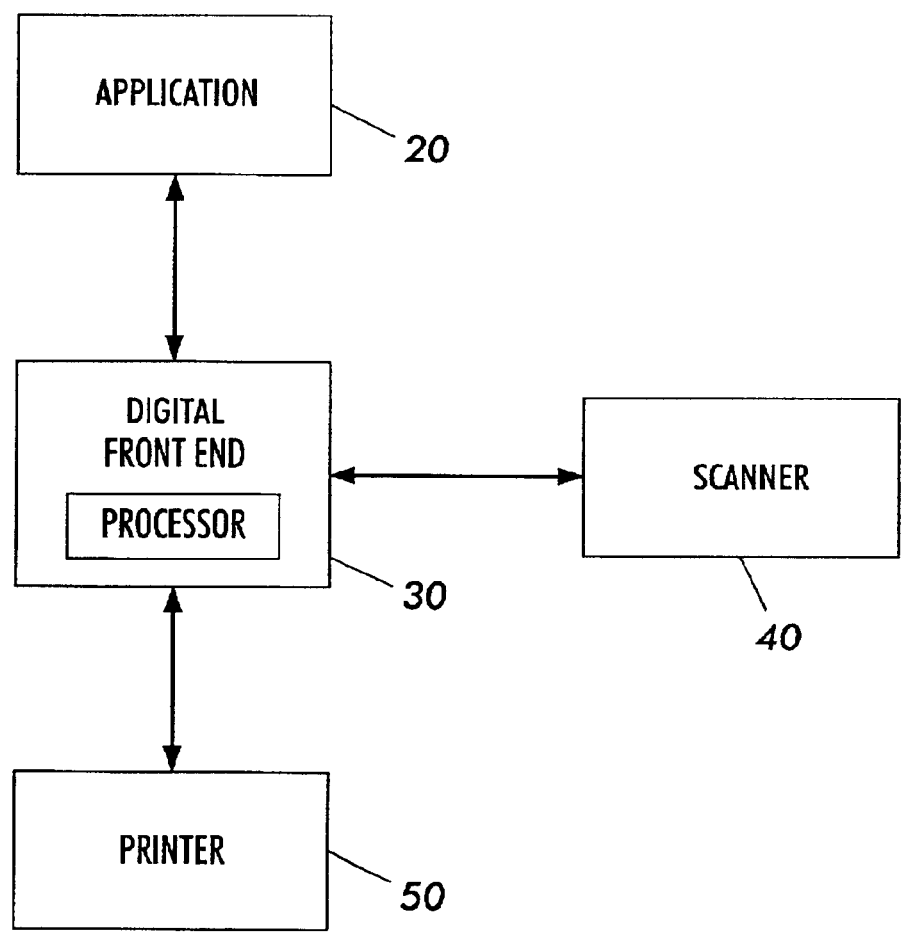
FIG. 1 is a block diagram showing a computer system employing a preferred embodiment of the present invention.

As illustrated in FIG. 1, the color printing system of a preferred embodiment includes a printer 50 (a xerographic or inkjet printing device) coupled through a digital front end ("DFE") 30 to application (or operating-system) software 20 and/or a scanner 40. A processor, within the DFE, controls the entire color printing system. A set of various color improvement operations black overprint, anti-aliasing, and/or trapping) are incorporated in the printer system that can be automatically invoked whenever certain objects of respective particular color-object types are to be printed in the absence of user selections, or these color improvement operations can be selected by the user to be performed upon certain user defined areas, windows, or pages.

The present invention has features that provide either automatic or manual implementation of various color improvement operations options. For example, an interactive user interface may allow a choice between one-"button" automatic control of color output or multibutton manual control of color output. Both automatic and manual options provide independent control for invoking black overprint, anti-aliasing, or trapping on an area, window, or page basis. The preferred embodiment allows separate area, window, or page selection for black overprint, anti-aliasing, and trapping.

Different print-quality modes in the print system invoke different color improvement options for a particular job to be printed. For example, a printer control may automatically invoke black overprint, anti-aliasing, and trapping whenever a high-quality mode is designated, and automatically invoke none of these color improvement options whenever a normal or fast print mode is designated.

Figure 2:
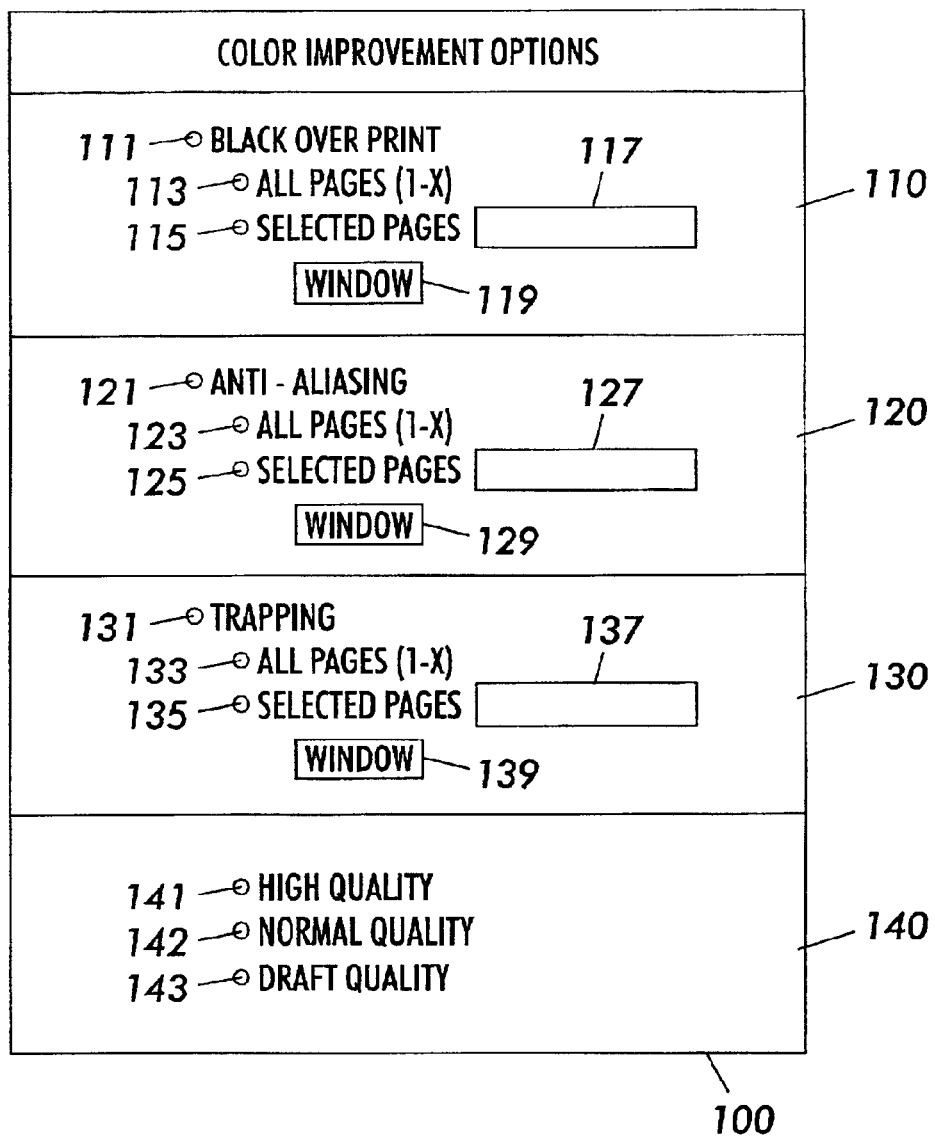
FIG. 2 is a graphical representation of user interface for selecting color improvement options on a page basis for a printing system according to the concepts of the present invention.

FIG. 2 illustrates a possible user interface display for implementing the present invention. A display 100 shows the possible color improvement options from which an operator can choose. For example, in display area 110, the operator can select the color improvement option black overprint by activating "button" 111. Upon activating this "button" 111, the "button" 113 becomes lit or highlighted to inform the user that its state is active. In other words, all pages (1–X) of the job will be processed using a black overprint routine. The black overprint routine can be any conventional black overprint process. The exact routine is not critical to the present invention. Such black overprint operations are well known to those skilled in the art.

If the operator desires less than all the pages processed with the black overprint routine, the operator selects or activates "button" 115. Upon activation of "button" 115, the fill-in box 117 is enable to allow the operator to input specific pages separated by commas or spaces and/or a sequential series can defined by dashes. In this manner, the operator can limit the operation of black overprint to these specific pages. The black overprint display area also has a window button 119 for defining a specific area within the specified pages. This windowing operation will be discussed further with respect to FIG. 3.

In another example, in display area 120, the operator can select the color improvement option anti-aliasing by activating "button" 121. Upon activating this "button" 121, the "button" 123 becomes lit or highlighted to inform the user that its state is active. In other words, all pages (1–X) of the job will be processed using an anti-aliasing routine. The anti-aliasing routine can be any conventional anti-aliasing process. The exact routine is not critical to the present invention. Such anti-aliasing operations are well known to those skilled in the art.

If the operator desires less than all the pages processed with the anti-aliasing routine, the operator selects or activates "button" 125. Upon activation of "button" 125, the fill-in box 127 is enable to allow the operator to input specific pages separated by commas or spaces and/or a sequential series can defined by dashes. In this manner, the operator can limit the operation of anti-aliasing to these specific pages. The anti-aliasing display area also has a window button 129 for defining a specific area within the specified pages. This windowing operation will be discussed further with respect to FIG. 3.

In a third example, in display area 130, the operator can select the color improvement option trapping by activating "button" 131. Upon activating this "button" 131, the "button" 133 becomes lit or highlighted to inform the user that its state is active. In other words, all pages (1–X) of the job will be processed using a trapping routine. The trapping routine can be any conventional trapping process. The exact routine is not critical to the present invention. Such trapping operations are well known to those skilled in the art.

If the operator desires less than all the pages processed with the trapping routine, the operator selects or activates "button" 135. Upon activation of "button" 135, the fill-in box 137 is enable to allow the operator to input specific pages separated by commas or spaces and/or a sequential series can defined by dashes. In this manner, the operator can limit the operation of trapping to these specific pages. The trapping display area also has a window button 139 for defining a specific area within the specified pages. This windowing operation will be discussed further with respect to FIG. 3.

Upon designating certain color improvement options and corresponding pages, the processor assigns a tag with the specified page indicating to the DFE what color improvement options, if any, are to be performed on that page. Thus, each page has a tag indicating which color improvement options, if any, have been assigned to that page.

Figure 3:
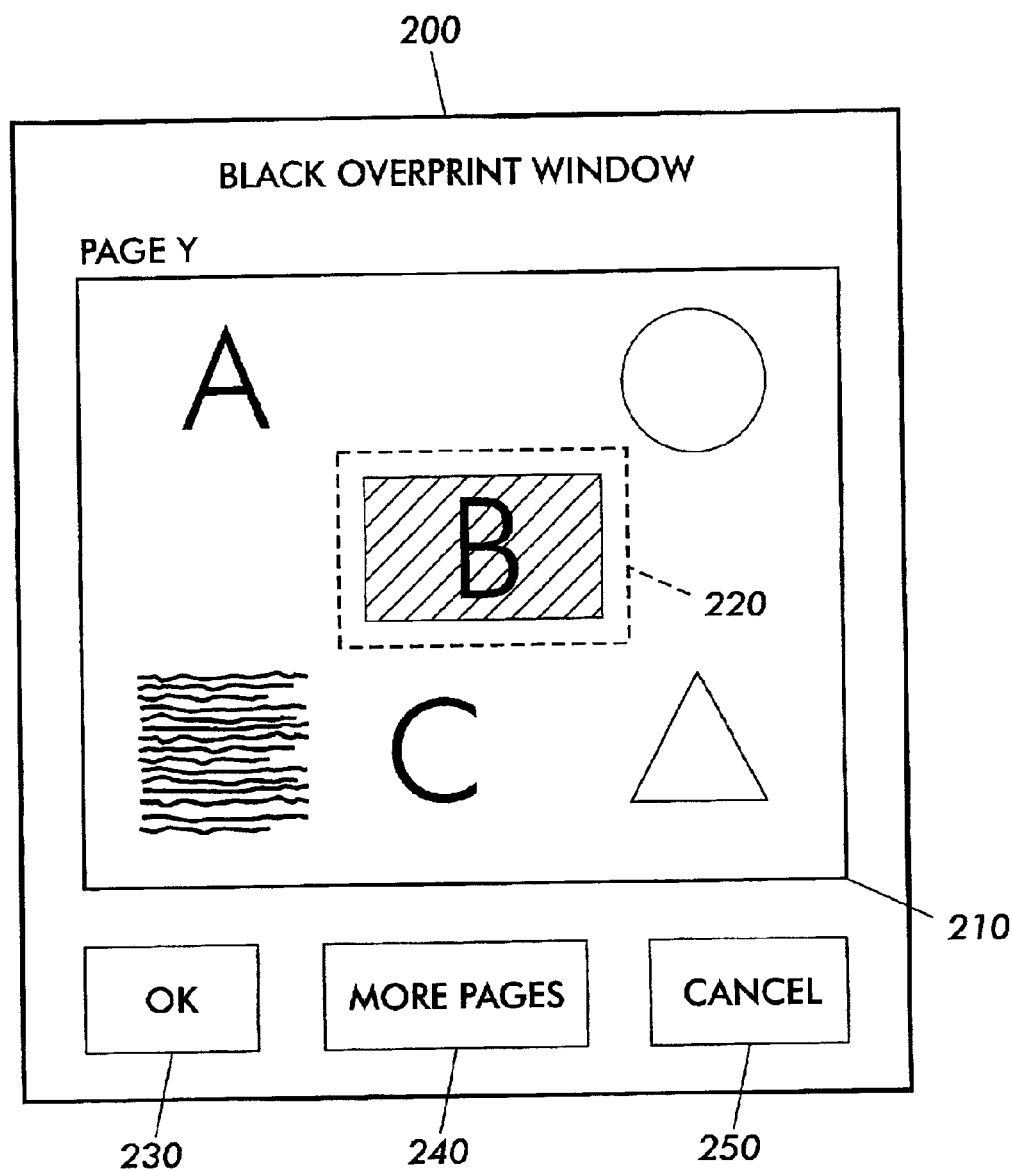
FIG. 3 is a graphical representation of user interface for selecting color improvement options on a window basis within a printing system according to the concepts of the present invention.

FIG. 3 illustrates a user interface display 200 that enables the operator to create a window within a selected page upon which the specific color improvement option is performed. The display 200 identifies the color improvement option and the page, in the example of FIG. 3, the option is black overprint and the page is Y. The display further includes a page area 210 that provides a rough preview of the page to be printed. A window 220 can be defined with a pointing device such as a mouse or a finger or stylus if the user interface is a touchscreen. The display 200 also can include "buttons" 230, 240, and 250. "Button" 240 allows the operator to navigate to other selected pages for windowing. The "button" completes the windowing process with all previously defined windows retained for processing. The "button" 250 completes the windowing process with all previously defined windows deleted.

While various examples and embodiments of the present invention have been shown and described, it will be appreciated by those skilled in the art that the spirit and scope of the present invention are not limited to the specific description and drawings herein, but extend to various modifications and changes all as set forth in the following claims.

What is claimed is:

1. A method of color printing for use in printing selective pages of color images within a print job having a plurality of pages, comprising:

(a) displaying an activatable first color improvement operation area;

(b) enabling. upon activation of the activatable first color improvement operation area, an activatable first color improvement operation specific individual page fill-in area;

(c) displaying, upon activation of the activatable first color improvement operation area, that the first color improvement operation is to be applied to all pages of the print job;

(d) enabling. upon activation of the activatable first color improvement operation specific individual page fill-in area, a user to designate specific individual pages of the print job to which the first color improvement operation is to be applied;

(e) determining if a page being processed is a page to which the first color improvement operation is to be applied; and (f) performing the first color improvement operation upon the image data associated with the page when it is determined that the page being processed is a page to which the first color improvement operation is to be applied.

2. The method of claim 1, further comprising:

(g) displaying an activatable second color improvement operation area;

(h) enabling, upon activation of the activatable second color improvement operation area, an activatable second color improvement operation specific individual page fill-in area;

(i) displaying, upon activation of the activatable second color improvement operation area, that the second color improvement operation is to be applied to all pages of the print job;

(j) enabling, upon activation of the activatable second color improvement operation specific individual page fill-in area, a user to designate specific individual pages of the print job to which the second color improvement operation is to be applied;

(k) determining if a page being processed is a page to which the second color improvement operation is to be applied; and (l) performing the second color improvement operation upon the image data associated with the page when it is determined that the page being processed is a page to which the second color improvement operation is to be applied.

3. The method of claim 2, further comprising:

(m) displaying an activatable third color improvement operation area;

(n) enabling, upon activation of the activatable third color improvement operation area, an activatable third color improvement operation specific individual page fill-in area;

(o) displaying, upon activation of the activatable third color improvement operation area, that the third color improvement operation is to be applied to all pages of the print job;

(p) enabling, upon activation of the activatable third color improvement operation specific individual page fill-in area, a user to designate specific individual pages of the print job to which the third color improvement operation is to be applied;

(q) determining if a page being processed is a page to which the third color improvement operation is to be applied; and (r) performing the third color improvement operation upon the image data associated with the page when it is determined that the page being processed is a page to which the third color improvement operation is to be applied.

4. The method of claim 1, wherein the first color improvement operation is black overprint.

5. The method of claim 1, wherein the second color improvement operation is anti-aliasing.

6. The method of claim 1, wherein the third color improvement operation is trapping.

7. A system of color printing for use in printing selective pages of color images within a print job having a plurality of pages, comprising:

a user interface to identify and select one or more different color improvement operations; and a processor to apply the selected different color improvement operations upon printing pages having color images thereon;

said user interface displaying an activatable first color improvement operation area;

said user interface enabling, upon activation of the activatable first color improvement operation area, an activatable first color improvement operation specific individual page fill-in area;

said user interface displaying, upon activation of the activatable first color improvement operation area, that the first color improvement operation is to be applied to all pages of the print job;

said user interface enabling, upon activation of the activatable first color improvement operation specific individual page fill-in area, a user to designate specific individual pages of the print job to which the first color improvement operation is to be applied;

said processor processing a page within a print job;

said processor if a page being processed is a page to which the first color improvement operation is to be applied;

said processor performing the first color improvement operation upon the image data associated with the page when it is determined that the page being processed is a page to which the first color improvement operation is to be applied.

8. The method of claim 7, wherein:

said user interface displays an activatable second color improvement operation area;

said user interface enabling, upon activation of the activatable second color improvement operation area, an activatable second color improvement operation specific individual page fill-in area;

said user interface displays, upon activation of the activatable second color improvement operation area, that the second color improvement operation is to be applied to all pages of the print job;

said user interface enabling, upon activation of the activatable second color improvement operation specific individual page fill-in area a user to designate specific individual pages of the print job to which the second color improvement operation is to be applied;

said processor determines if a page being processed is a page to which the second color improvement operation is to be applied; and said processor performs the second color improvement operation upon the image data associated with the page when it is determined that the page being processed is a page to which the second color improvement operation is to be applied.

9. The system of claim 8, wherein:

said user interface displays an activatable third color improvement operation area;

said user interface enabling, upon activation of the activatable third color improvement operation area, an activatable third color improvement operation specific individual page fill-in area;

said user interface displays, upon activation of the activatable third color improvement operation area, that the third color improvement operation is to be applied to all pages of the print job;

said user interface enabling, upon activation of the activatable third color improvement operation specific individual page fill-in area, a user to designate specific individual pages of the print job to which the third color improvement operation is to be applied;

said processor determines if a page being processed is a page to which the third color improvement operation is to be applied; and said processor performs the third color improvement operation upon the image data associated with the page when it is determined that the page being processed is a page to which the third color improvement operation is to be applied.

10. The system of claim 7, wherein the first color improvement operation is black overprint.

11. The system of claim 7, wherein the second color improvement operation is anti-aliasing.

12. The system of claim 7, wherein the third color improvement operation is trapping.

* * * * *